(12) United States Patent
Workman et al.

(10) Patent No.: US 7,126,076 B2
(45) Date of Patent: Oct. 24, 2006

(54) METHOD FOR REPAIRING DEFECTS IN A METALLIC SUBSTRATE USING WELDING

(75) Inventors: David P. Workman, Dublin, OH (US); James L. Reynolds, Jr., Columbus, OH (US); Timothy J. Trapp, Upper Arlington, OH (US); Jerry E. Gould, Grandview Heights, OH (US)

(73) Assignee: Edison Welding Institute, Inc., Columbus, OH (US)

( * ) Notice: Subject to any disclaimer, the term of this patent is extended or adjusted under 35 U.S.C. 154(b) by 135 days.

(21) Appl. No.: 10/772,701

(22) Filed: Feb. 5, 2004

(65) Prior Publication Data

US 2005/0173492 A1    Aug. 11, 2005

(51) Int. Cl.
*B23K 11/00* (2006.01)
(52) U.S. Cl. .................................. 219/117.1; 228/119
(58) Field of Classification Search ............. 219/117.1; 228/119; 29/402.01, 402.18
See application file for complete search history.

(56) References Cited

U.S. PATENT DOCUMENTS

| | | | |
|---|---|---|---|
| 1,039,673 A | 9/1912 | Schatz | |
| 1,154,808 A | 9/1915 | Rietzel | |
| 1,278,357 A | 9/1918 | Lachman | |
| 1,330,241 A | 2/1920 | Cutter | |
| 1,367,553 A | 2/1921 | Kicklighter | |
| 1,568,080 A * | 1/1926 | Meadowcroft | 219/118 |
| 1,592,605 A | 7/1926 | Ledwinka | |
| 1,939,395 A | 12/1933 | Hughes | |
| 2,817,981 A | 12/1957 | Brownell | |
| 3,081,587 A * | 3/1963 | Heckethorn | 53/404 |
| 3,934,107 A * | 1/1976 | Evertz | 219/76.12 |
| 4,096,374 A | 6/1978 | Gasparrini | |
| 4,225,772 A | 9/1980 | Bacha | |
| 5,075,531 A * | 12/1991 | Sofue et al. | 219/118 |
| 6,107,595 A | 8/2000 | Peterson | |
| 6,281,467 B1 | 8/2001 | Gould et al. | |
| 6,460,750 B1 | 10/2002 | Coletta et al. | |
| 6,545,244 B1 * | 4/2003 | Gould et al. | 219/118 |

FOREIGN PATENT DOCUMENTS

GB    2 000 710 A  *  1/1979

* cited by examiner

*Primary Examiner*—Kevin P. Kerns
(74) *Attorney, Agent, or Firm*—Gallagher & Dawsey Co., LPA; David J. Dawsey; Michael J. Gallagher

(57) ABSTRACT

A method for repairing defects in a metallic substrate including the steps of placing a consumable filler slug in contact with the substrate in the vicinity of the defect; bringing a first electrode and a second electrode in contact with the consumable slug and applying a pressure to the consumable slug; and transmitting electrical current between the electrodes for a period, thereby resistively heating the consumable slug and the metallic substrate resulting in coalescence in a substantially liquid pool that fills the defect. The pool is then cooled to solidification under the pressure of the electrodes. The electrodes are then removed from contact with the consumable slug and excess material may be removed. The consumable slug may be formed as a single unit or multiple sections, and may incorporate sacrificial retainers to add additional defect filling material, retain the pool, and seal the pool from atmosphere.

18 Claims, 5 Drawing Sheets ic # METHOD FOR REPAIRING DEFECTS IN A METALLIC SUBSTRATE USING WELDING

STATEMENT REGARDING FEDERALLY SPONSORED RESEARCH OR DEVELOPMENT

This invention was not made as part of a federally sponsored research or development project.

TECHNICAL FIELD

The present invention relates to the field of material defect repair; particularly, to a method and apparatus for repairing material defects utilizing a consumable filler slug, electrical current, and pressure to resistively melt the slug and repair the defect.

BACKGROUND OF THE INVENTION

Repairing defects in manufactured assemblies costs industries hundreds of millions of dollars each year. In fact, many industries view repairing defects in assemblies constructed of relatively thin metallic sheet materials, and the very high cost of these repairs, as a necessary evil and have invested heavily in preventing such defects rather than identifying more cost effective ways to repair such defects. The aircraft industry is just one of many industries plagued by this problem.

In the aircraft industry, parts are often manufactured to very exacting tolerances. As such, penetrations in aircraft parts are generally not made until after the part is manufactured and meets the predetermined tolerances. Such penetrations may be required for the insertion of bolts, or rivets, or as a means for cooling the part. One can easily appreciate that many of the hundreds of thousands of such penetrations in an aircraft are misplaced during assembly despite even the most exacting quality control measures. Such undesired holes, or material defects, then need to be repaired, while minimizing negative effects to the part. Additionally, the need frequently arises to repair damaged, corroded, or worn holes in parts that have already been in service for a period of time.

The aircraft industry, as well as virtually all industries that experience similar problems, currently rely upon arc welding and friction plug welding to repair such defects. Arc welding repair of relatively thin sheet metallic substrates requires a very skilled welder. Additionally, no matter how skilled the welder, the very nature of arc welding results in a large amount of heat input that is applied asymmetrically over the defect to repair the defect. As such, arc welding repairs have large heat affected zones that can influence mechanical and corrosion performance in the repair area. The large heat affected zone often results in local distortion of the repaired substrate that then requires post-weld treatment to return the substrate to the desired tolerances. A further limitation to arc welding repairs is the significant amount of pre and post weld preparation of the defect area required to produce a quality weld and ensure the desired part geometry is produced.

An even greater limitation introduced when using arc welding to repair defects is that the repair weld is often of less than optimal quality and that filler materials must often be used that reduce performance of the component to improve the weldability of the surrounding substrate. This can result in repairs of significantly less strength than the surrounding substrate. For instance, filler metals having very high ductility, but less than desired strength and corrosion properties, are often required to minimize solidification cracking when using arc welding to repair defects in materials that have been in use for a period of time and suffer from reduced ductility. This is particularly true in the aircraft industry where holes often require repair after the aircraft has been in service for several years. In such repairs it is not uncommon that filler metals having strengths of 60% of the strength of the adjoining parent material are required so as to avoid solidification cracking of the weld repair.

As previously mentioned, friction plug welding has also been used to repair defects and holes in manufactured assemblies. Friction plug welding offers some advantages over the previously mentioned arc welding method in that it is a solid state process, and produces a narrow heat affected zone. This minimizes the influence on mechanical and corrosion properties of the finished product.

The friction plug welding process has some definite limitations, which are primarily associated with the need to apply and react the mechanical loads associated with this process. Friction welding uses a consumable plug that must be rotated at high rpm and then pressed into a tapered hole to produce the repair. As such, the consumable plug is generally much larger than needed to produce the repair so that the plug can be rigidly gripped to allow the transfer of high speed and large loads. The reaction of the loads induced into the component by the plug typically requires specialized rigid tooling. The friction welding equipment used to produce the weld is typically very large due to the rotational energy that must be applied to the plug and the axial load necessary to force the plug into the tapered hole. An additional limitation of friction plug welding is that it requires line of sight access to the repair area, thereby limiting it to only the most simple repairs. Further, friction plug welding equipment is expensive and less readily available than arc welding or resistance welding equipment.

The instant invention addresses many of the shortcomings of the prior art and allows for previously unavailable benefits. A method of repairing defects in a metallic substrate that overcomes many of the limitations of the prior art has long been needed. The method of the present invention is designed to reduce the need for a skilled welder to effect repairs, and to result in a repaired substrate having greatly improved material properties, while negating many of the limitations of prior repair techniques. The method accomplishes such improvements by utilizing a relatively low heat input applied over a very short period of time and cooling of the repaired substrate. Additional benefits of the present method arise from the substantially uniform application of heat to the repair region and the fact that it typically requires no special preparation of defects prior to repair. Further, the equipment used to produce the repair is common in many manufacturing facilities and is relatively inexpensive to procure and maintain.

SUMMARY OF INVENTION

In its most general configuration, the present invention advances the state of the art with a variety of new capabilities and overcomes many of the shortcomings of prior methods in new and novel ways. In one of the many preferable configurations, the method comprises a method of repairing defects in a metal substrate using welding. The method comprises, in general, the steps of placing a consumable filler slug in contact with the substrate in the vicinity of the defect; bringing a first electrode and a second electrode in contact with the consumable filler slug and applying a pressure to the consumable filler slug; and transmitting electrical current between the electrodes through the slug for a period of time. This resistively heats the slug and the metallic substrate resulting in coalescence in a substantially liquid pool that fills the defect; followed by cooling the substantially liquid pool to solidification under the pressure of the first electrode and the second electrode; and removing the electrodes from contact with the consumable filler slug.

The metallic substrate of the present invention may be formed of any resistance spot weldable metallic substance, but has particular advantages in repairing titanium alloys, high strength austenitic nickel-chromium-iron alloys and superalloys, and aluminum. Substrates may be a single sheet of material having a first surface and a second surface, but this method may perform equally as well on substrates having complex curvature, variable thickness, and heterogeneous compositions.

The present method may repair defects having a wide variety of characteristics, such as tears, voids extending all the way through the substrate, dents, or areas of compression or reduced thickness. The method generally begins with the placement of the consumable filler slug in contact with the substrate in the vicinity of the defect. The consumable filler slug may be formed in a number of equally effective configurations, such as single units or multiple sections, or conforming or merely roughly approximating the defect. The slug may also take the form of a washer or other configuration that works preferably with the electrodes or achieves desired flow to, or within, the defect.

An embodiment having multiple slug sections is contemplated. In such an embodiment, the consumable filler slug includes a first slug section and a second slug section such that the slug sections are configured to be in contact through the void. The consumable filler slug may be used in conjunction with at least one sacrificial retainer. The sacrificial retainer may be placed on each open end of the void, however, the present method is equally effective utilizing a single sacrificial retainer. A multi-part slug may incorporate exterior retaining lips that act in many ways as a sacrificial retainer.

The consumable filler slug and sacrificial retainer may be formulated to have properties similar, or dissimilar, to the metallic substrate, or be made of the same material as the metallic substrate. This can lead to the repaired area having substantially the same, or markedly different, properties from that of the substrate. For example, the present invention's ability to use consumable filler slugs of virtually any resistance weldable composition creates the ability to augment the strength or corrosion performance of the metallic substrate.

The next step in the method includes bringing the electrodes in contact with the consumable filler slug and applying a pressure to the slug. Then, with the electrodes in contact with the slug, and potentially with the metallic substrate, an electrical current is transmitted from the first electrode to the second electrode through the slug for a period of time thereby resistively heating the slug and the metallic substrate. The heat generated from the current flow and the resistance of the slug and metallic substrate results in the melting of a substantial portion of the slug and a portion of the metallic substrate and coalescence into a substantially liquid pool that fills the defect. The first and second electrodes exert a pressure on the substantially liquid pool as it is created and as it solidifies.

Unlike other repair techniques, the consumable filler slug and metallic substrate material surrounding the resistively heated area prevent oxidation. Therefore, this method does not require the use of a shielding gas, thereby reducing the cost of repairing defects as well increasing the versatility of the method. Additionally, the incorporation of a sacrificial retainer creates the ability to further seal the substantially liquid pool from the surrounding atmosphere, if desired. Further, the sacrificial retainer tends to keep the electrodes clean. In such an embodiment, the sacrificial retainer is placed between the slug and the first electrode through which the current passes and resistively heats. A portion of the sacrificial retainer coalesces into the pool and a portion of the sacrificial retainer remains solid and constrains the flow of the pool and seals the pool from the surrounding atmosphere. The portion of the sacrificial retainer that remains solid, and any portion of the solidified pool, may be removed by finishing processes to bring the level of the repaired defect down to the level of the adjoining metallic substrate. The method may be performed such that the electrical current is substantially uniformly transmitted from the first electrode to the second electrode. Such uniform transmission results in substantially symmetric resistive heating of the slug and the metallic substrate and substantially uniform heating of the defect, unlike previous defect repair techniques having non-symmetric thermal profiles around the defect during repair and solidification. The application of nearly uniform heat around the entire perimeter of the defect substantially helps eliminate distortion.

With the instant invention, the period of the heat input and the amount of heat input of the present invention is significantly less than that of previous defect repair techniques. Further, the amount of heat that remains in the repaired metallic substrate is significantly less using the method of the present invention, as will be discussed later herein, further reducing distortion and improving performance of the repaired defect.

The substantially liquid pool is then cooled to solidification. The pressure exerted on the substantially liquid pool during solidification reduces contraction stresses during solidification of the pool since the fusion zone remains under compressive loading. This tends to prevent solidification and liquation cracks from forming in the repaired defect. The cooling of the liquid pool is generally accomplished by utilizing water cooled electrodes, but may be accomplished through the use of a number of heat transfer processes. The cooling of the pool, as well as the short period of heat input, produces a repaired metallic substrate containing very little residual heat. The small amount of residual heat in the repaired metallic substrate and rapid cooling of the substantially liquid pool further minimize distortion and significantly improve the performance of the repaired defect.

After obtaining the desired predetermined level of cooling, the electrodes are removed from contact with the slug and the repair is complete. Alternative embodiments may include providing local post weld heat treatment after producing the repair, but before releasing the welding pressure. Such post weld heat treatment may resistively heat the repair for a predetermined time to locally produce a predetermined microstructure. Additional embodiments may include additional steps such as a step of removing excess slug material so that the surface of the repaired defect is substantially consistent with the level of the adjoining substrate surface.

Variations, modifications, alternatives, and alterations of the various preferred embodiments, processes, and methods may be used alone or in combination with one another as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

DETAILED DESCRIPTION OF THE INVENTION

Figure 1:
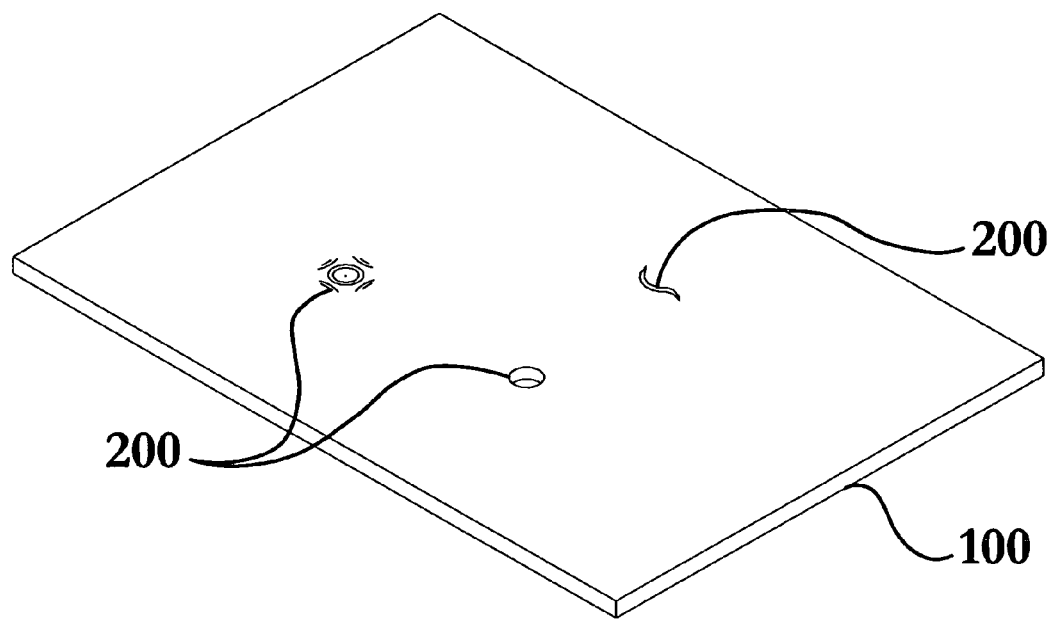
FIG. 1 shows a metallic substrate having various defect embodiments in elevated perspective view, not to scale.

The method for repairing a defect in a metallic substrate using welding enables a significant advance in the state of the art. The preferred embodiments of the apparatus accomplish this by new and novel methods that are configured in unique and novel ways and which demonstrate previously unavailable but preferred and desirable capabilities. The description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

One exemplary embodiment of the method for repairing a defect 200 in a metallic substrate 100 using welding includes the steps of placing a consumable filler slug 300 in contact with the substrate 100 in the vicinity of the defect 200; bringing a first electrode 410 and a second electrode 420 in contact with the consumable filler slug 300 and applying a pressure to the consumable filler slug 300; transmitting electrical current 440 from the first electrode 410 to the second electrode 420 through the consumable filler slug 300 for a period of time thereby resistively heating the consumable filler slug 300 and the metallic substrate 100 resulting in coalescence in a substantially liquid pool 500 that fills the defect 200; cooling the substantially liquid pool 500 to solidification under the pressure of the first electrode 410 and the second electrode 420; and removing the first electrode 410 and the second electrode 420 from contact with the consumable filler slug 300.

Figure 5:
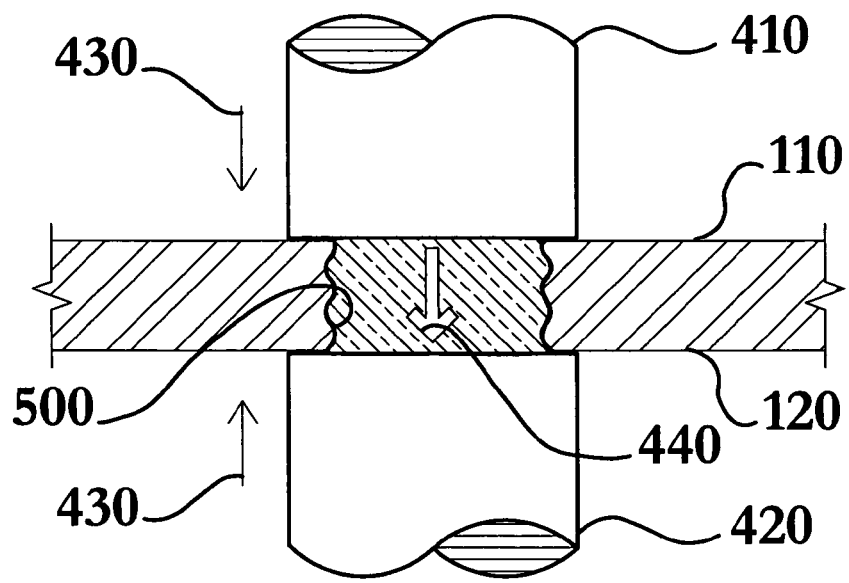
FIG. 5 shows a partial cross-sectional view of the setup of FIG. 4 having a substantially liquid pool, not to scale.
Figure 6:
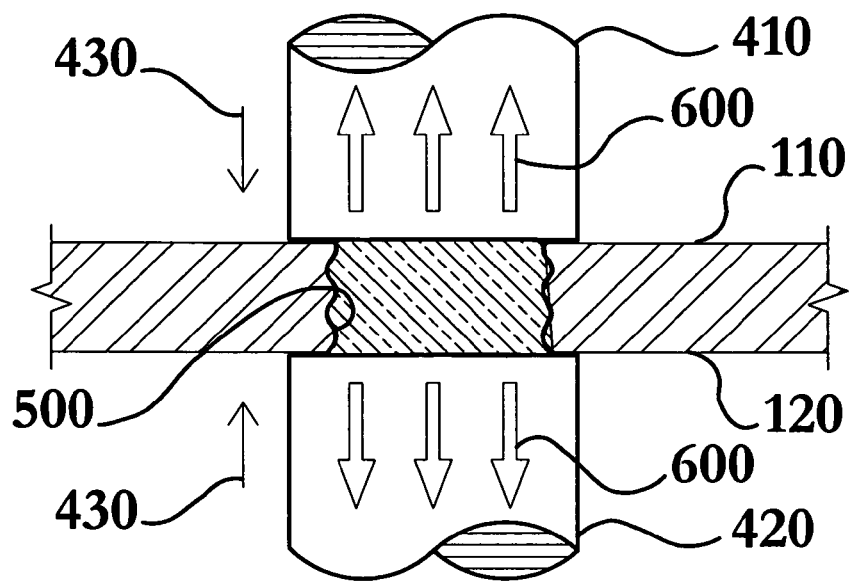
FIG. 6 shows a partial cross-sectional view of the setup of FIG. 5 with the electrodes removing heat from the pool and metallic substrate, not to scale.

The metallic substrate 100 of the present invention may be formed of any resistance spot weldable metallic substance. The method has particular advantages in repairing titanium alloys, high strength austenitic nickel-chromium-iron alloys and superalloys, and aluminum, but may be used with virtually any metal that can be resistively melted. Additionally, the substrate 100 may be configured in any number of ways that facilitate the transfer of current 440 through the defect 200. The substrate 100 is illustrated in FIG. 1 through FIG. 13 as a single sheet of material having a first surface 110 and a second surface 120. One with skill in the art will appreciate that this is just one illustrative embodiment and that this method may perform equally as well on substrates 100 of varied geometries including, but not limited too, substrates 100 having complex curvature, variable thickness, and heterogeneous compositions. Further, one with skill in the art will recognize that the shape of the weld pool 500 in FIG. 5, FIG. 6, and FIG. 8 is merely schematic in nature and does not represent the actual shape of the weld pool in practice.

Figure 2:
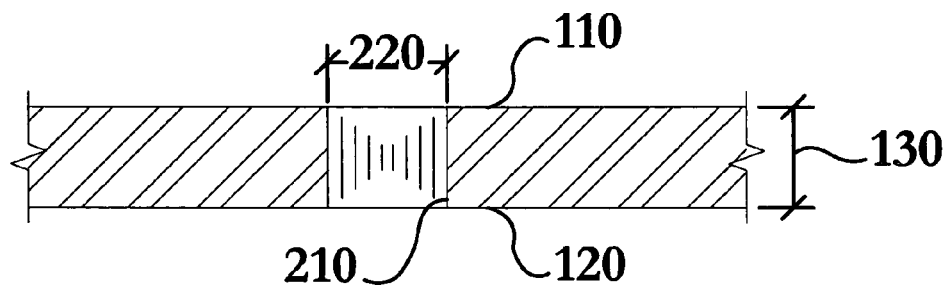
FIG. 2 shows a partial cross-sectional view of the metallic substrate having a cylindrical void, not to scale.

The present method may repair defects 200 having a wide variety of characteristics. For instance, the method may be used to repair defects 200 that consist of a tear in the substrate 100, those that are voids 210 extending all the way through the substrate 100, dents, or areas of compression or areas of reduced thickness, in the substrate 100, as seen in FIG. 1, and any number of surface imperfections such as corroded holes, mislocated holes, oversized holes, and holes that are out of round. The method is described herein generally with reference to a defect 200 that is a void 210 extending through the substrate 100 from the first surface 110 to the second surface 120, as illustrated in FIG. 2, but the method applies equally to the number of other defects 200 referred to herein.

Figure 3:
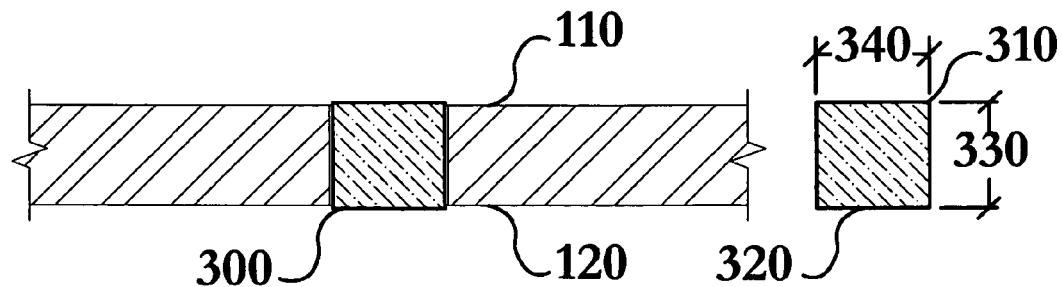
FIG. 3 shows a partial cross-sectional view of the metallic substrate having a cylindrical void with a consumable filler slug in place, not to scale.
Figure 9:
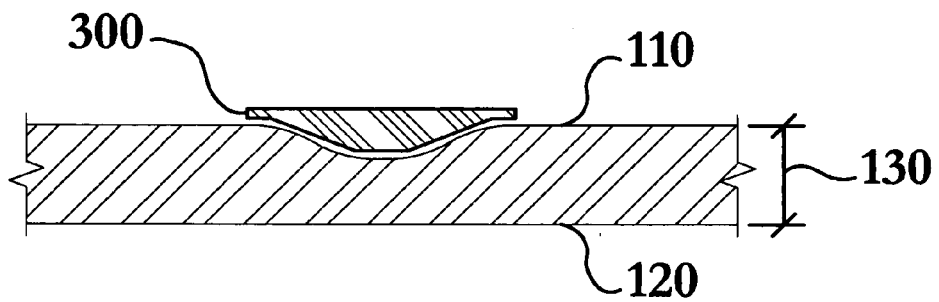
FIG. 9 shows an alternative defect containing a consumable filler slug in partial cross-sectional view, not to scale.
Figure 10:
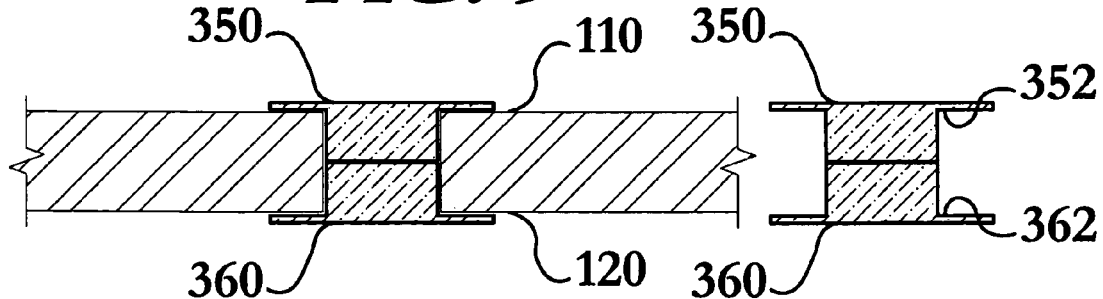
FIG. 10 shows an alternative embodiment of the consumable filler slug having a first slug section and a second slug section, in partial cross-sectional view, not to scale.

The method generally begins with the placement of the consumable filler slug 300 in contact with the substrate 100 in the vicinity of the defect 200. The consumable filler slug 300 may be formed in a number of equally effective configurations. For instance as illustrated in FIG. 3, the consumable filler slug 300 may be a single unit or may be composed of multiple slug sections, as seen in FIG. 10. The consumable filler slug 300 may, but is not required to, substantially conform to the shape and configuration of the defect 200. For instance, FIG. 9 illustrates an embodiment having a consumable filler slug 300 that substantially conforms to the shape of the dent, or defect 200. The consumable filler slug 300 of the present embodiment may be formed in any number of alternative shapes. For instance, the filler slug 300 may take the form of a washer or other configuration that works preferably with the electrodes or achieves desired flow to, or within, the defect 200.

Similarly, the consumable filler slug 300 may be configured to substantially conform to the void 210 extending through the substrate 100, as illustrated in FIG. 3. The void 210 of this particular embodiment is substantially cylindrical in shape having a diameter 220 and a length equal to the thickness 130 of the substrate 100, as seen in FIG. 2. However, in practice it is common for the void to have a length that is less than the substrate 100 when necking of the material has occurred. This particular embodiment will be referred to throughout for ease of explanation and illustration. Referring again to FIG. 3, an embodiment of the consumable filler slug 300 for such a void 210 is one being substantially cylindrical in shape, having a diameter 340, and a distal end 310 and a proximal end 320 separated by a length 330. Typically, the diameter of the consumable filler slug 300 is less than the diameter of the void 210 for ease of installation, but this is not required and a consumable filler slug 300 that necessitates being driven into the defect 200 is anticipated.

Figure 11:
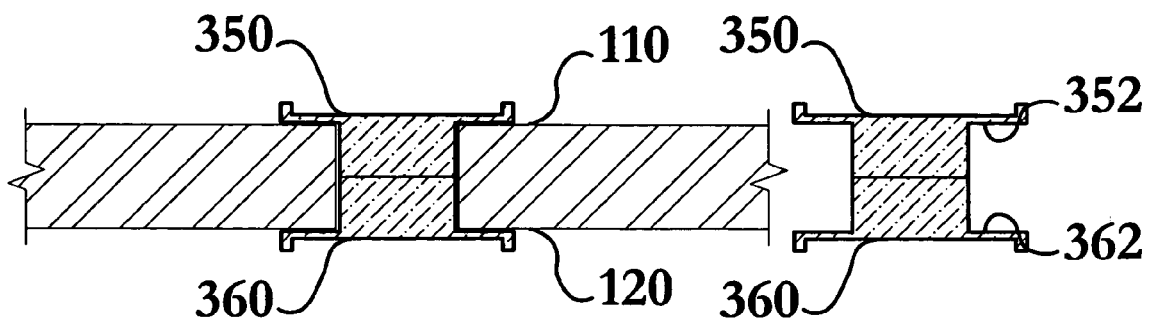
FIG. 11 shows an alternative embodiment of the consumable filler slug having a first slug section and a second slug section, in partial cross-sectional view, not to scale.

An embodiment having multiple slug sections is illustrated in FIG. 10. In this embodiment the consumable filler slug 300 includes a first slug section 350 and a second slug section 360 such that the first slug section 350 and the second slug section 360 are configured to be in contact through the void 210. In this particular embodiment the first slug section 350 and the second slug section 360 incorporate retaining lips 352,362 to provide the same advantages as the sacrificial retainers 370, discussed later herein. Further, retaining lips 352, 362 of FIG. 10 may be formed with upturned edges, as seen in FIG. 11. The upturned retaining lips 352,362 of FIG. 11 may be configured to cooperate with the shape of the first or second electrodes 410, 420. The configuration of FIG. 11 promotes accurate alignment and placement of the consumable filler slugs 350, 360 and the electrodes 410, 420, and may reduce, or eliminate, the need for non-electrically conductive locating fixtures.

Figure 7:
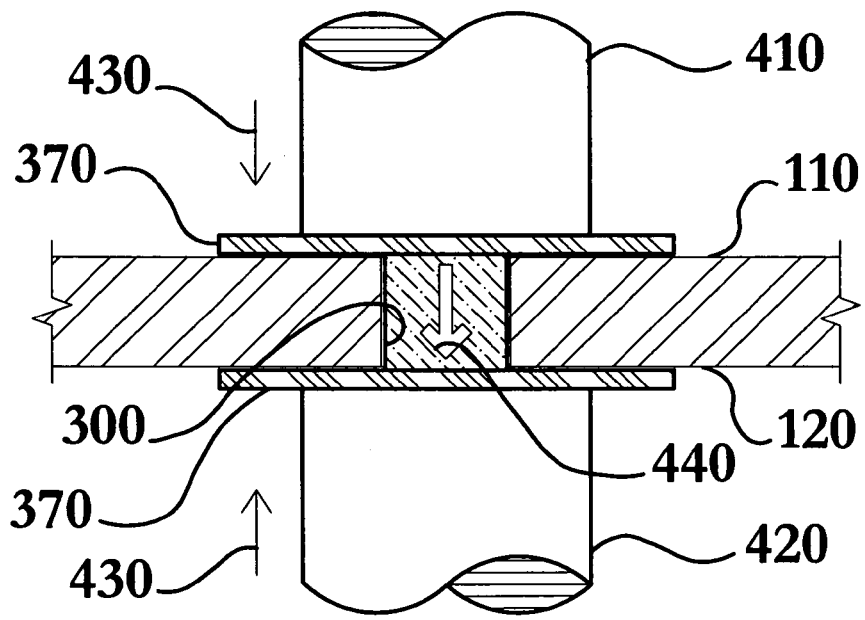
FIG. 7 shows an embodiment incorporating a plurality of sacrificial retainers in partial cross-sectional view, with the electrodes in place, not to scale.
Figure 8:
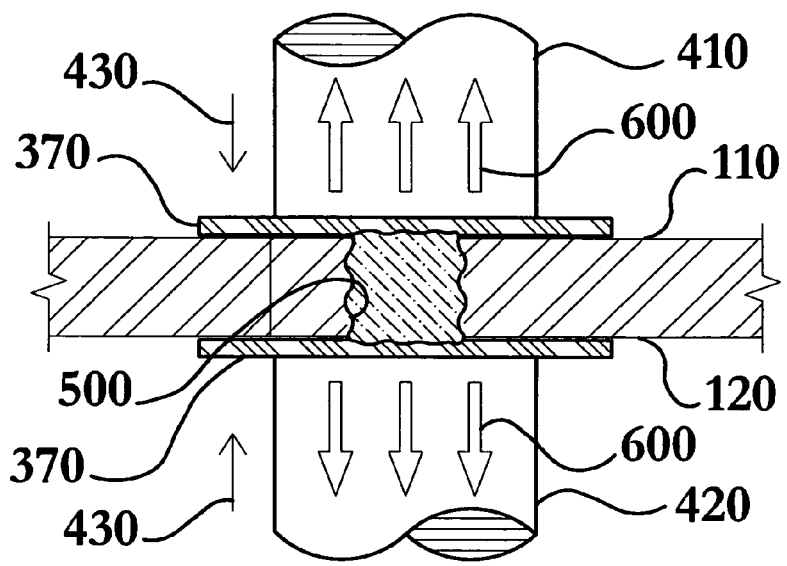
FIG. 8 shows a partial cross-sectional view of the setup of FIG. 7 having a substantially liquid pool, not to scale.

The consumable filler slug 300 may be used in conjunction with at least one sacrificial retainer 370, as seen in FIG. 7. The embodiments illustrated in FIG. 7 and FIG. 8 utilize a sacrificial retainer 370 on each open end of the void 210, however the present method is equally effective utilizing a single sacrificial retainer 370. In a further embodiment the beneficial features of the sacrificial retainer 370 may be incorporated directly into the consumable filler slug 300, as will be explained later herein.

The consumable filler slug 300 and the sacrificial retainer 370 may be formulated to have properties similar, or dissimilar, to the metallic substrate 100. In fact, the consumable filler slug 300 and the sacrificial retainer 370 may be the same material as the metallic substrate 100. This is particularly beneficial in that the repaired defect 700 is no longer limited by the use of a limited number of filler products, as is the case with GTAW welding.

For example, it is widely understood that grain size plays a notable role in both notched and smooth fatigue tests of many titanium alloys. Generally, GTAW repairs of titanium sheet metal result in grains having a diameter between approximately one-half of the metal thickness to the entire thickness, thereby greatly reducing the performance of the repair. The method of the present invention may be used to produce fine grained structure in the repaired defect and a minimal heat affected zone. In fact, the present method may be used to achieve grain size in the repaired defect that is close to that of the base metal. Such grain size control may be used to greatly enhance the performance of the repaired defect, especially in fatigue. For example, the changes in fatigue strength of TI-6Al-4V at $10^7$ cycles to failure may vary between 406 MPa and 551 MPa, depending on grain size. This method may be used to control grain size such that the best performance grain size for each alloy may be achieved in the repaired defect.

In yet another example, GTAW welds are generally used to repair defects 200 in 6061 aluminum. In this situation a 4043 aluminum filler is used. The deposited weld metal in the defect 200, a misplaced rivet hole in this example, generally has a yield strength of 10,500 psi and an ultimate strength of 21,000 psi. The present method may use a consumable filler slug 300 of 6061 aluminum, which after repair and heat treatment can achieve a yield strength of 39,000 psi and an ultimate strength of 45,000 psi, an improvement of almost a factor of 4 for the yield strength and more than doubling the ultimate strength.

A further example of the benefits of this invention is illustrated in nickel-based and cobalt alloys that have been in service and require repair of a defect 200. Repairing the defect 200 in such a material generally requires the use of a filler metal having high ductility because the elongation of the base material is often greatly reduced during its life which tends to promote solidification cracking of repairs. For instance the strength of an overaged high strength austenitic nickel-chromium-iron alloy part can be approximately 180,000 psi, but the part will generally have very low ductility. Therefore, repairing a defect 200 in such a material may require the use of a lower strength alloy having high ductility to reduce the likelihood of cracking, but a strength of only 100,000 psi. Such ductility problems are eliminated by the present invention, in part due to the fact that the substantially liquid pool 500 is kept under constant compressive loading, as will be discussed later herein.

Still further, the present inventions ability to use consumable filler slugs 300 of virtually any composition creates the ability to augment the strength of the metallic substrate 100. This ability is desired in a number of industries. For instance, in many industries the thickness of sheet metal parts is determined by the allowable stress at a particular load connection point, such as a rivet or bolt hole. If the strength of the material could be locally augmented in the vicinity of the rivet or bolt hole, then the thickness of the remainder of the part may be reduced. In high temperature applications, such as the combustor of a jet engine, it would be advantageous to place a material with better corrosion and oxidation resistance at higher temperatures in only those areas subjected to particularly high loading, while constructing the bulk of the combustor from less expensive materials. As such, the present method may be used to create engineered surfaces designed to accept the higher temperatures in particular areas. This may be accomplished by using the method of the present invention to essentially line a bolt or rivet hole in one substrate with a material having better corrosion or oxidation resistance characteristics.

Figure 4:
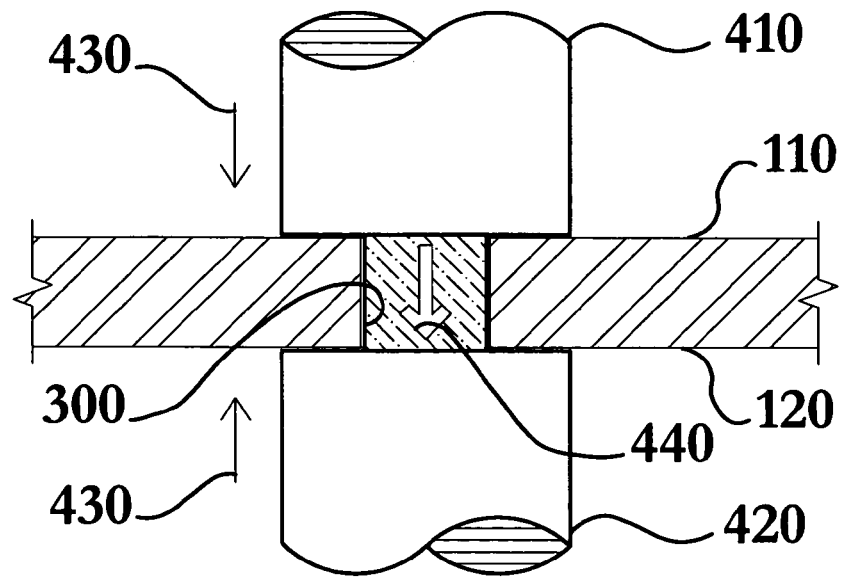
FIG. 4 shows a partial cross-sectional view of the setup of FIG. 3 with the electrodes in place, not to scale.

The next step in the method includes bringing a first electrode 410 and a second electrode 420 in contact with the consumable filler slug 300 and applying a pressure, or force 430, to the consumable filler slug 300, as seen in FIG. 4. Then, with the electrodes in contact with the consumable filler slug 300, and potentially with the metallic substrate 100, an electrical current 440 is transmitted from the first electrode 410 to the second electrode 420 through the consumable filler slug 300 for a period of time, thereby resistively heating the consumable filler slug 300 and the metallic substrate 100. The heat generated from the current 440 transfer and the resistance of the consumable filler slug 300 and metallic substrate 100 results in the melting of a substantial portion of the consumable filler slug 300 and a portion of the metallic substrate 100, resulting in coalescence into a substantially liquid pool 500 that fills the defect 200, illustrated in FIG. 5. The first and second electrodes 410,420 exert a pressure on the substantially liquid pool 500 as it is created and as it solidifies.

Figure 13:
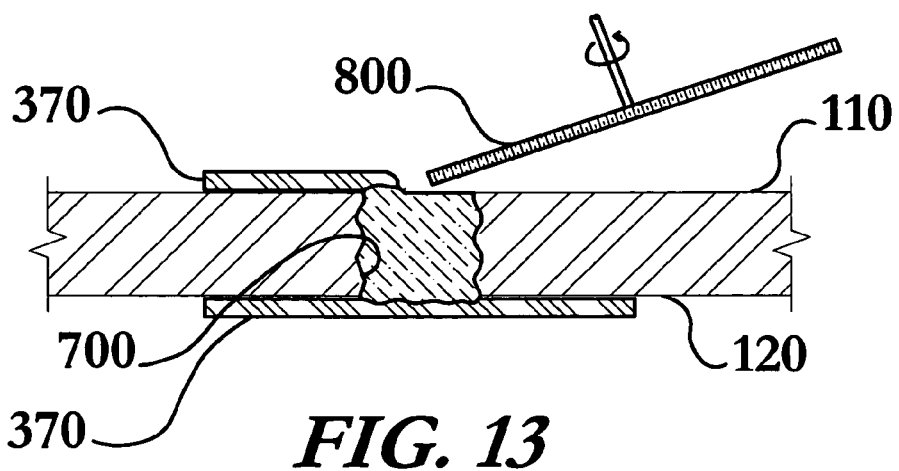
FIG. 13 shows a repaired defect having the repaired surface brought to the level of the surrounding surfaces, in partial cross-sectional view, not to scale.

Unlike other repair techniques, the thermal cycle of the present method is so rapid that oxidation is not an issue. As such, this method does not require the use of a shielding gas thereby reducing the cost of repairing defects 200 as well as increasing the versatility of the method. Additionally, the incorporation of the sacrificial retainer 370, seen in FIG. 7, creates the ability to quickly seal the substantially liquid pool 500 from the surrounding atmosphere, if desired. Further, the sacrificial retainer 370 helps minimize tip sticking and pickup on the welding electrode thereby lengthening the electrode tip life. For instance, the substantially liquid pool 500 illustrated in FIG. 8 is sealed from the surrounding atmosphere by the sacrificial retainers 370 in approximately $\frac{1}{100}$ second. In such an embodiment the sacrificial retainer 370 is placed between the consumable filler slug 300 and the first electrode 410 through which the current 440 passes and resistively heats. A portion of the sacrificial retainer 370 coalesces into the pool 500 and a portion of the sacrificial retainer 370 remains solid and constrains the flow of the pool 500 and seals the pool 500 from the surrounding atmosphere. The portion of the sacrificial retainer 370 that remains solid, and any portion of the solidified pool, may be removed by finishing processes to bring the level of the repaired defect down to the level of the adjoining metallic substrate 100, as seen in FIG. 13. It is estimated that the repair time required to correct defects commonly encountered in the manufacture of a jet engine augmentor duct will be reduced from 10 hours, when using traditional arc welding methods, to 3 hours, when using the present method.

In yet another embodiment the method is performed such that the electrical current 440 is substantially uniformly transmitted from the first electrode 410 to the second electrode 420. Such uniform transmission results in substantially symmetric resistive heating of the consumable filler slug 300 and the metallic substrate 100 and substantially uniform heating of the defect 200, unlike previous defect 200 repair techniques having non-symmetric thermal profiles around the defect 200 during repair and solidification. The application of nearly uniform heat around the entire perimeter of the defect 200 substantially eliminates distortion. For example, identical one-inch by three-inch samples of 0.040 inch thick Ti 6-4 with identical defects were repaired using GTAW welding and the method of the present invention. The GTAW welded sample resulted in a distortion of 0.070 inches out of the plane. The sample repaired using the method of the present invention resulted in a distortion of 0.003 inches out of the plane, over a 95% reduction in distortion. Repairs made using GTAW welds generally require extensive rework to return the repaired metallic substrate 100 to the original tolerances. The sample using the present method was repaired using class 2 copper $\frac{1}{2}$ inch body diameter electrodes having a face diameter of $\frac{5}{16}$ inch and producing approximately 6 volts, 8000 amps, for $\frac{1}{6}$ second.

Additionally, the period of the heat input and the amount of heat input of the present invention is significantly less than that of previous defect repair techniques. For example, the present method may utilize a heat input of roughly 8,000 joules to repair most defects, whereas commonly used GTAW weld repair produces approximately 23,400 joules of heat input, almost four times that of the present invention. Further, the amount of heat that remains in the repaired metallic substrate 100 is significantly less using the method of the present invention, as will be discussed later herein, further reducing distortion and improving performance of the repaired defect 700.

The substantially liquid pool 500 is then cooled to solidification. The pressure exerted on the substantially liquid pool 500, during solidification ensures that tensile stress is reduced during solidification of the pool 500 since the fusion zone remains under compressive loading. This tends to prevent solidification cracks from forming in the repaired defect 700. The cooling of the liquid pool 500 is generally accomplished by utilizing water cooled electrodes for the first and second electrode 410, 420, but may be accomplished through the use of a number of heat transfer processes, as illustrated by the heat transfer flow arrows 600 in FIG. 6 and FIG. 8. The cooling of the pool 500, as well as the short period of heat input, produces a repaired metallic substrate 100 containing very little residual heat. For example, the previously discussed sample produced using this method had approximately 240 joules of residual heat almost immediately after being subjected to 8,000 joules. Conversely, the sample repaired using GTAW welding had roughly one hundred percent of the input 23,400 joules remaining in the substrate 100 upon completion of the repair. One embodiment of the present method is specifically directed to producing a repaired metallic substrate 100 having less than approximately 5% of the heat input actually remaining in the repaired metallic substrate 100 upon completion of the repair.

The small amount of residual heat in the repaired metallic substrate 100 and rapid cooling of the substantially liquid pool 500 further minimize distortion and significantly improves the performance of the repaired defect 700. For instance, the rapid cooling of the liquid pool 500 under pressure can significantly reduce the grain size in the resulting repaired metallic substrate 100. These benefits are particularly beneficial in the repair of titanium because the process greatly reduces, or eliminates, the formation of alpha case in the titanium, which is highly undesirable in fatigue sensitive applications. In yet another embodiment of this invention, the amount of cooling applied to the pool 500 is varied as the pool 500 solidifies to achieve a desired predetermined property. For instance, the varied cooling may be tuned to obtain a preferred grain size in the repaired metallic substrate 100. Additionally, the cooling rate may be set for a preferred cooling rate of the material of the metallic substrate 100.

Figure 12:
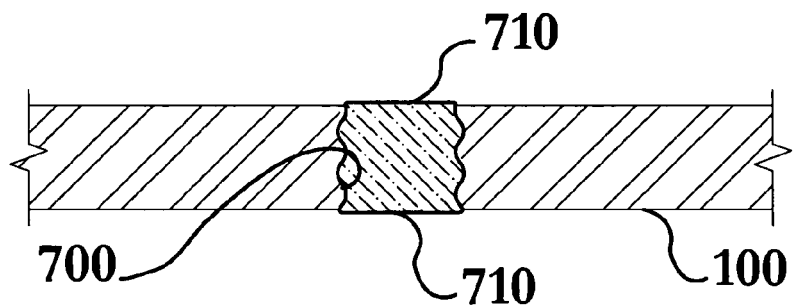
FIG. 12 shows a repaired defect after removal of the excess consumable filler slug, in partial cross-sectional view, not to scale.

After obtaining the desired predetermined level of cooling, the first electrode 410 and the second electrode 420 are removed from contact with the consumable filler slug 300 and the repair is complete, as seen in FIG. 12. Alternative embodiments may include additional steps such as a step of removing excess consumable filler slug 300 material with a material processing device 800, such as a grinder, so that the surface 710 of the repaired defect 700 is substantially consistent with the level of the adjoining substrate 100 surface, illustrated in FIG. 13. Removal of excess consumable filler slug 300 material is often desired as it may serve as an indicator that the entire defect 200 has been repaired.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

We claim:

1. A method for repairing a defect in a metallic substrate using welding, the substrate having a first surface and a second surface, the method comprising:
   a) placing a consumable filler slug in contact with the defect;
   b) placing a sacrificial retainer in contact with the consumable filler slug;
   c) transmitting electrical current from a first electrode to a second electrode for a period, thereby resistively heating the consumable filler slug, the sacrificial retainer, and the metallic substrate resulting in coalescence in a substantially liquid pool that substantially fills the defect wherein a portion of the sacrificial retainer remains solid and constrains flow of the pool and seals the pool from a surrounding atmosphere, the first electrode and the second electrode applying pressure to the substantially liquid pool;
   d) cooling the substantially liquid pool to solidification under the pressure of the first electrode and the second electrode producing a repaired metallic substrate; and
   e) removing the first electrode and the second electrode from contact with the repaired metallic substrate.

2. The method of claim 1, wherein the defect is a void extending from the substrate first surface to the substrate second surface.

3. The method of claim 2, wherein the consumable filler slug includes a first slug section and a second slug section, the first slug section having a retaining lip configured to be in contact with the substrate first surface and the second slug section having a retaining lip configured to be in contact with the substrate second surface such that as current passes from the first electrode to the second electrode and resistively heats the first slug section and the second slug section a portion of each retaining lip coalesces into the pool and a portion of each retaining lip remains solid to constrain the flow of the pool.

4. The method of claim 1, further including the step of applying a first sacrificial retainer between the consumable filler slug and the first electrode and applying a second sacrificial retainer between the consumable filler slug and the second electrode, wherein the void is substantially cylindrical in shape, having a diameter and a volume, and the consumable filler slug is substantially cylindrical having a diameter smaller than the diameter of the void, a volume, and a distal end and a proximal end whereby the consumable filler slug is configured to be received by the void, such that current passes and resistively heats the sacrificial retainers and the consumable filler slug and a portion of the sacrificial retainers coalesce into the pool and a portion of the retainers remain solid and constrain the flow of the pool and seal the pool from the surrounding atmosphere.

5. The method of claim 1, wherein the electrical current is substantially uniformly transmitted from the first electrode to the second electrode thereby substantially symmetrically resistively heating the consumable filler slug and the metallic substrate and substantially uniformly heating the defect.

6. The method of claim 1, wherein the period of transmitting electrical current from the first electrode to the second electrode is less than approximately 200 milliseconds.

7. The method of claim 1, wherein less than approximately 5% of the heat input to the consumable filler slug and the metallic substrate by the transmission of current from the first electrode to the second electrode remains in the repaired metallic substrate upon removal of the first electrode and the second electrode.

8. The method of claim 1, wherein the amount of cooling applied to the pool is varied as the pool solidifies to achieve a desired predetermined property.

9. The method of claim 8, wherein the desired predetermined property is a preferred grain size.

10. The method of claim 1, wherein the consumable filler slug is composed of the same material as the substrate.

11. The method of claim 1, wherein the repaired metallic substrate is substantially free of distortion.

12. The method of claim 1, wherein the repaired metallic substrate is substantially free of solidification cracks.

13. The method of claim 1, further including a step of removing excess consumable filler slug material, after the electrodes are removed, so that the surface of the repaired defect is substantially consistent with the level of the adjoining substrate surface.

14. A method for repairing a void in a metallic substrate using welding, the substrate having a first surface and a second surface, wherein the void extends from the substrate first surface to the substrate second surface, the method comprising;
   a) placing a consumable filler slug in contact with the void;
   b) transmitting electrical current substantially uniformly from a first electrode to a second electrode for a period, thereby substantially symmetrically resistively heating the consumable filler slug and the metallic substrate resulting in coalescence in a substantially liquid pool that substantially fills the void, the first electrode and the second electrode applying pressure to the substantially liquid pool, wherein the consumable filler slug includes a first slut section and a second slug section, the first slug section having a retaining lip configured to be in contact with the substrate first surface and the second slug section having a retaining lip configured to be in contact wit the substrate second surface such that as current passes from the first electrode to the second electrode and resistively heats the first slug section and the second slug section a portion of each retaining lip coalesces into the pool and a portion of each retaining lip remains solid to constrain flow of the pool;
   c) cooling the substantially liquid pool to solidification under the pressure of the first electrode and the second electrode producing a repaired metallic substrate;
   d) removing the first electrode and the second electrode from contact with the repaired metallic substrate; and
   e) removing excess consumable filler slug material so that the surface of the repaired void is substantially consistent with the level of the adjoining substrate surface.

15. The method of claim 14, further including the step of applying a sacrificial retainer between the consumable filler slug and the first electrode through which the current passes and resistively heats, a portion of the sacrificial retainer coalescing into the pool and a portion of the retainer remaining solid and constraining the flow of the pool and sealing the pool from surrounding atmosphere.

16. The method of claim 14, further including the step of applying a first sacrificial retainer between the consumable filler slug and the first electrode and applying a second sacrificial retainer between the consumable filler slug and the second electrode, wherein the void is substantially cylindrical in shape, having a diameter and a volume, and the consumable filler slug is substantially cylindrical having a diameter smaller than the diameter of the void, a volume, and a distal end and a proximal end whereby the consumable filler slug is configured to be received by the void, such that current passes and resistively heats the sacrificial retainers and the consumable filler slug and a portion of the sacrificial retainers coalesce into the pool and a portion of the retainers remain solid and constrain the flow of the pool and seal the pool from a surrounding atmosphere.

17. The method of claim 14, wherein less than approximately 5% of the heat input to the consumable filler slug and the metallic substrate by the transmission of current from the first electrode to the second electrode remains in the repaired metallic substrate upon removal of the first electrode and the second electrode.

18. A method for repairing a defect that is a substantially cylindrically shaped void in a metallic substrate using welding, the substrate having a first surface and a second surface, and the void extending from the first surface to the second surface, the method comprising:

a) placing a substantially cylindrical consumable filler slug in the void and applying a first sacrificial retainer on the first surface and a second sacrificial retainer on the second surface such that the first sacrificial retainer and the second sacrificial retainer cover the void and the consumable filler slug;

b) transmitting electrical current substantially uniformly from a first electrode to a second electrode for a period of less than approximately 200 milliseconds while applying pressure to the first sacrificial retainer and the second sacrificial retainer, thereby substantially symmetrically resistively heating the first sacrificial retainer, the consumable filler slug, the metallic substrate, and the second sacrificial retainer resulting in coalescence of a portion of the first sacrificial retainer, the consumable filler slug, a portion of the substrate, and a portion of the second sacrificial retainer in a substantially liquid pool that substantially fills the void while being retained by the first sacrificial retainer and the second sacrificial retainer;

c) cooling the substantially liquid pool to solidification under the pressure of the first electrode and the second electrode producing a repaired metallic substrate such that less than approximately 5% of the heat input to the consumable filler slug and the metallic substrate by the transmission of the current remains in the repaired metallic substrate and the repaired metallic substrate is substantially free of distortion;

d) removing the first electrode and the second electrode from contact with the first sacrificial retainer and the second sacrificial retainer; and e) removing excess consumable filler slug material so that the surface of the repaired defect is substantially consistent with the level of the adjoining substrate surface.

* * * * *